United States Patent
Anand et al.

(10) Patent No.: US 10,887,419 B2
(45) Date of Patent: Jan. 5, 2021

(54) FAST CACHE PURGE OPTIMIZATION HANDLING OF UNAVAILABLE NODES

(71) Applicant: Akamai Technologies, Inc., Cambridge, MA (US)

(72) Inventors: Ashok Anand, Bangalore (IN); Manjunath Bharadwaj Subramanya, Bangalore (IN)

(73) Assignee: Akamai Technologies, Inc., Cambridge, MA (US)

( * ) Notice: Subject to any disclaimer, the term of this patent is extended or adjusted under 35 U.S.C. 154(b) by 234 days.

(21) Appl. No.: 15/375,028

(22) Filed: Dec. 9, 2016

(65) Prior Publication Data

US 2017/0094012 A1    Mar. 30, 2017

Related U.S. Application Data

(63) Continuation of application No. 14/280,413, filed on May 16, 2014, now Pat. No. 9,549,040, which is a continuation-in-part of application No. 14/206,458, filed on Mar. 12, 2014, now Pat. No. 9,002,990.

(51) Int. Cl.
*H04L 29/08*    (2006.01)
*H04L 12/911*   (2013.01)
*H04L 12/861*   (2013.01)

(52) U.S. Cl.
CPC .......... *H04L 67/2852* (2013.01); *H04L 49/90* (2013.01)

(58) Field of Classification Search
CPC ........... H04L 29/0854; H04L 29/08549; H04L 47/826; H04L 49/90; H04L 67/10; H04L 67/1002; H04L 67/1095; H04L 67/1097; H04L 67/2842; H04L 67/2852
See application file for complete search history.

(56) References Cited

U.S. PATENT DOCUMENTS

| | | | | |
|---|---|---|---|---|
| 3,916,113 A * | 10/1975 | Heck | ...................... | H04Q 3/545 340/2.21 |
| 5,559,988 A * | 9/1996 | Durante | ................ | G06F 3/0601 711/100 |
| 5,724,542 A | 3/1998 | Taroda | | |
| 6,070,190 A * | 5/2000 | Reps | .................... | G06F 11/3495 709/203 |
| 6,345,352 B1 * | 2/2002 | James | ................. | G06F 12/1027 711/207 |
| 6,502,125 B1 * | 12/2002 | Kenner | ............. | G06F 17/30781 348/E5.008 |

(Continued)

*Primary Examiner* — Lance Leonard Barry

(57) ABSTRACT

Processing a purge request is disclosed. In an embodiment, the purge request is received from a node, where the purge request is for a next purge instruction and the node has an associated queue of purge instruction(s) with associated timestamps. In response to receiving the purge request, providing an unprocessed purge instruction having a time stamp before a threshold time. After processing the purge instruction having a timestamp before the threshold time, processing the remaining purge instructions as follows: indicating an availability state of the node as transitional, storing a current time value as a reference time value, processing in chronological order those remaining purge instructions in the queue with a time value chronologically before the reference time value, and indicating an availability state of the node as available.

17 Claims, 11 Drawing Sheets

(56) References Cited

U.S. PATENT DOCUMENTS

| | | | |
|---|---|---|---|
| 6,754,782 B2* | 6/2004 | Arimilli | G06F 12/0817 |
| | | | 711/119 |
| 7,921,259 B2 | 4/2011 | Elazary et al. | |
| 8,117,276 B1* | 2/2012 | Sakata | G06F 9/541 |
| | | | 709/213 |
| 8,484,319 B2 | 7/2013 | Wein et al. | |
| 8,943,180 B1* | 1/2015 | Petit-Huguenin | H04L 67/16 |
| | | | 709/223 |
| 9,002,990 B1 | 4/2015 | Anand | |
| 9,128,944 B2 | 9/2015 | Shiell et al. | |
| 9,130,846 B1* | 9/2015 | Szabo | H04L 41/0893 |
| 9,413,842 B2 | 8/2016 | Shiell et al. | |
| 9,509,804 B2 | 11/2016 | Stevens et al. | |
| 9,641,640 B2 | 5/2017 | Flack et al. | |
| 9,648,125 B2 | 5/2017 | Flack et al. | |
| 9,654,579 B2 | 5/2017 | Stevens et al. | |
| 9,667,747 B2 | 5/2017 | Shotton et al. | |
| 9,813,515 B2 | 11/2017 | Flack et al. | |
| 10,120,924 B2 | 11/2018 | Wong et al. | |
| 2002/0087765 A1* | 7/2002 | Kumar | G06F 12/1027 |
| | | | 710/107 |
| 2002/0152175 A1* | 10/2002 | Armstrong | G06Q 20/382 |
| | | | 705/64 |
| 2005/0054358 A1 | 3/2005 | Zhang et al. | |
| 2006/0136654 A1 | 6/2006 | Franklin | |
| 2006/0218362 A1* | 9/2006 | McManis | H04L 12/44 |
| | | | 711/162 |
| 2008/0155308 A1 | 6/2008 | McDonough et al. | |
| 2008/0168260 A1* | 7/2008 | Zyuban | G06F 9/3838 |
| | | | 712/214 |
| 2009/0222509 A1* | 9/2009 | King | G06F 17/30194 |
| | | | 709/203 |
| 2012/0042034 A1* | 2/2012 | Goggin | G06F 9/4856 |
| | | | 709/216 |
| 2013/0007228 A1* | 1/2013 | Sherman | G06F 17/3089 |
| | | | 709/219 |
| 2013/0031170 A1 | 1/2013 | Pacella et al. | |
| 2013/0179486 A1 | 7/2013 | Lee | |
| 2013/0339567 A1 | 12/2013 | Carpentier et al. | |
| 2015/0264154 A1 | 9/2015 | Anand et al. | |

* cited by examiner

FAST CACHE PURGE OPTIMIZATION HANDLING OF UNAVAILABLE NODES

CROSS REFERENCE TO OTHER APPLICATIONS

This application is a continuation of U.S. patent application Ser. No. 14/280,413 FAST CACHE PURGE OPTIMIZATION HANDLING OF UNAVAILABLE NODES filed May 16, 2014, now U.S. Pat. No. 9,549,040, which is incorporated herein by reference for all purposes, which is a continuation in part of U.S. patent application Ser. No. 14/206,458, now U.S. Pat. No. 9,002,990, entitled FAST CACHE PURGE IN CONTENT DELIVERY NETWORK filed Mar. 12, 2014 which is incorporated herein by reference for all purposes.

BACKGROUND OF THE INVENTION

Traditionally, purging (e.g., removing or modifying) stored content served by a content delivery network (CDN) can often take up to 24 hours. In order to confirm that an indicated content has been purged across the entire CDN, a purge request must be propagated out to the entire CDN network and a confirmation of completion of the purge request (e.g., confirmation that the indicated content of the purge request has been removed from the local storage/cache of the node) must be received from every content delivery node of the CDN. In CDNs with a large number of nodes, it is likely that some of the nodes are temporarily unreachable for a few seconds to a few hours at various different times due to maintenance, upgrades, and/or errors. If a node is unavailable, the desired content purge cannot be completed and confirmed until the node becomes available again to process the purge request. Often other processes and services cannot proceed until a confirmation of the desired content purge is received. Therefore, there exists a need to reduce the amount of time required to confirm a purge of desired content.

BRIEF DESCRIPTION OF THE DRAWINGS

Various embodiments of the invention are disclosed in the following detailed description and the accompanying drawings.

DETAILED DESCRIPTION

Figure 1:
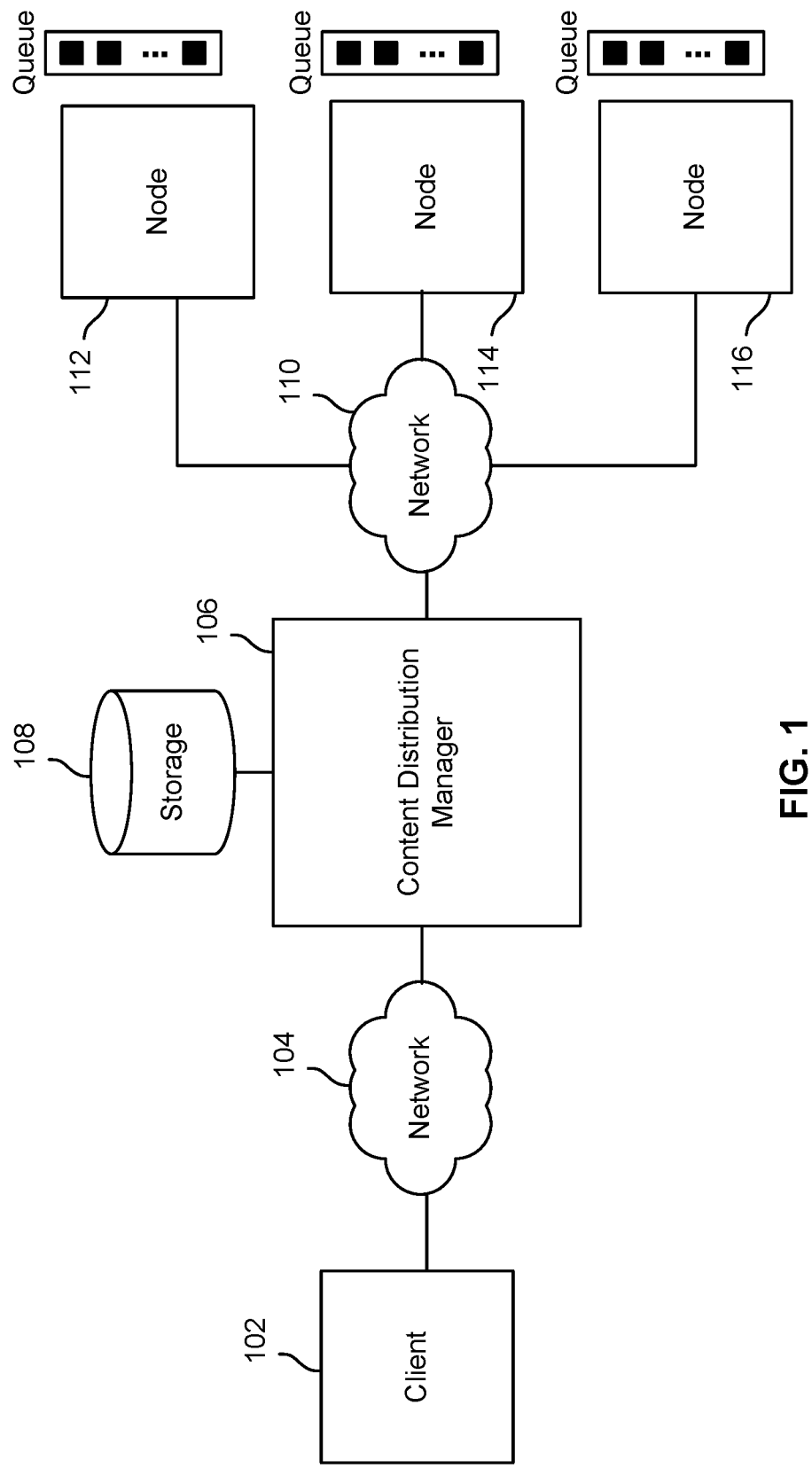
FIG. 1 is a block diagram illustrating an embodiment of a content distribution network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content distribution network manager is disclosed. In some embodiments, a purge request is received from a client. For example, a request to remove and/or update an indicated content being provided via a content distribution network is received from a content provider that initially provided the indicated content to be served to users by the content distribution network. One or more purge instructions are generated for content distribution nodes of a content distribution network. For example, an instruction to purge an indicated content is provided to available status content distribution nodes of the content distribution network. It is verified that each of the content distribution nodes of the content distribution network has either completed processing the one or more purge instructions or is determined to be unavailable. For example, if a content distribution node is unresponsive to the purge instruction, the purge instruction may be retried a predetermined number of times until the content distribution node is determined to be unavailable. Despite at least one content distribution node determined to be unavailable and having not completed processing the one or more purge instructions, an indication that the purge request has been completed is authorized. When the unavailable node becomes responsive and available again, the entire cache of the node may be purged to ensure that the node does not serve stale data. Purging data from a cache storage may include deleting the data, moving the data, and/or marking the data (e.g., marked for garbage collection).

FIG. 1 is a block diagram illustrating an embodiment of a content distribution network environment. Client 102 communicates with content distribution manager 106 via network 104. In some embodiments, client 102 provides a request to purge a specified content being served/distributed by a content distribution network. For example, client 102 sends an instruction using an Application Programming Interface (API) of manager 106, and the instruction specifies a content to be purged (e.g., specified content to be removed and/or replaced from the content distribution network). Examples of client 102 include a server, a system, a device, and any other computer able to instruct content distribution manager 106. Client 102 may be a part of an origin server that initially provided the indicated content to be purged to the content distribution network. Content distribution manager 106 manages purging of the specified content served by a content distribution network. The content distribution network includes one or more distributed systems that provide content to one or more users via a network. For example, the content distribution network includes one or more nodes and systems of a CDN. In the example shown, nodes 112, 114, and 116 are included in a content distribution network. Nodes 112, 114, and 116 may be edge nodes of a CDN or load balanced servers of a server farm. Nodes 112, 114, and 116 may be content distribution nodes that are each able to distribute mirrored content from its local storage/cache. For example, nodes 112, 114, and 116 are each located in different geographical locations and provide the same content to users near the geographical location of each node to minimize delay associated with providing content from servers located geographically far away. Nodes 112, 114, and 116 may be each associated with a local cache/storage where content to be served/provided by the node is stored. Each local cache/storage may be included in each node or connected to each node via a networked or direct connection.

Content distribution manager 106 communicates with nodes 112, 114, and 116 via network 110. Network 104 and network 110 may be the same network or different networks. For example, network 110 and network 104 are both the Internet. In another example, network 104 is the Internet and network 110 is a local area network. Content distribution manager 106 may include one or more devices and servers. Content distribution manager 106 maintains an availability status (e.g., whether a node is online, offline, or in a transitional state) of each node of the content distribution network managed by content distribution manager 106. The status may be updated by manager 106 and/or directly by a node. The status may be stored in storage 108. Examples of storage 108 include a database, a table, a hash table, a list, a memory, and any other data structure or device configured to store data. Storage 108 may be connected to manager 106 directly, via network 104 and/or network 110. Content distribution manager 106 maintains a separate purge instruction queue for each node of the content distribution network maintained by manager 106. The queue includes purge instructions ready to be provided to an associated node when the node is ready to receive the instruction. For example, if a node is unavailable, the queue stores queued purge instructions ready to be provided to the node when the node becomes available again. The queue for each node may be stored in storage 108 and/or another storage/data structure of manager 106. For each received purge request, manager 106 adds in each purge instruction queue of the content distribution nodes of the content distribution network to be purged, a corresponding instruction to purge the specified content of the purge request from the cache/storage of each node.

In some embodiments, rather than managing queues for each node of the content distribution network, all entries of the cache of the node that are unavailable are purged before the node becomes available (e.g., online) again. By purging every cache entry, individual purge instructions received while the node is unavailable do not have to be tracked and maintained by storing the instructions in queues for the nodes. The empty cache may be populated again with up to date data by obtaining cache data from one or more other peer nodes (e.g., nearby nodes) of the content distribution network. In some embodiments, the empty cache may be populated again using only popular data (e.g., most frequently accessed data) of one or more other peer nodes. Popular data may be identified by identifying a subset of data cached by a peer node that has been accessed at least a threshold number of times within a predetermined time period. In some embodiments, rather than purging all cache entries of the unavailable node that is becoming available, the node obtains a cache summary from another peer available node and validates entries of its cache based on the summary. In some embodiments, whether to clear the entire cache or validate each entry of the cache using cache summary is selectively determined based at least in part on the length of time a node has been unavailable before becoming available again. For example, if the node has been unavailable for less than a threshold amount of time, the cache entries are validated using a received cache summary and if the node has been unavailable for greater than or equal to the threshold amount of time, all cache entries are purged.

One or more of the following may be included in networks 104 and 110: a direct or indirect physical communication connection, mobile communication network, Internet, intranet, Local Area Network, Wide Area Network, Storage Area Network, a wireless network, a cellular network, and any other form of connecting two or more systems, communication devices, components, or storage devices together. Although example instances of components have been shown to simplify the diagram, additional instances of any of the components shown in FIG. 1 may exist. Any of the components shown in FIG. 1 may be physically integrated in a single hardware component or may represent a plurality of hardware components. Components not shown in FIG. 1 may also exist. Manager 106 and/or storage 108 may be one of a plurality of replicated/redundant systems and/or devices.

Figure 2:
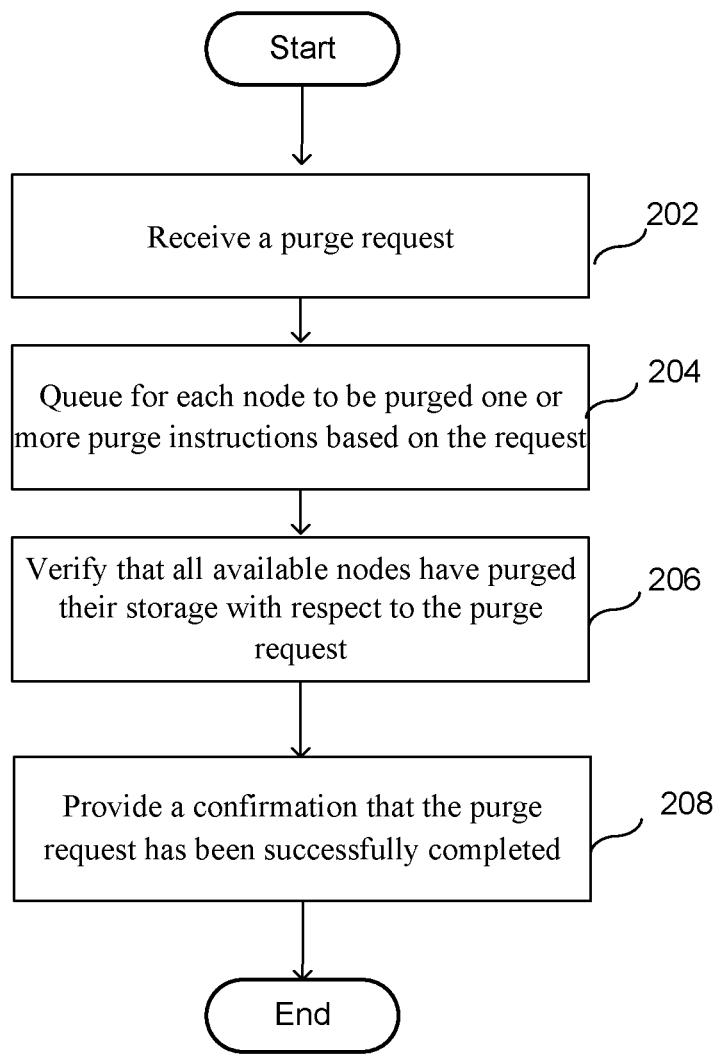
FIG. 2 is a flowchart illustrating an embodiment of a process for processing a purge request.

FIG. 2 is a flowchart illustrating an embodiment of a process for processing a purge request. The process of FIG. 2 may be at least in part implemented on content distribution manager 106 of FIG. 1.

At 202, a purge request is received. The purge request may specify that content is to be removed and/or updated from cache/storage of content distribution nodes of a content distribution network. The content distribution network may include one or more nodes that mirror content and provide content to various users that may be able to obtain content faster from one content distribution node over another node. In some embodiments, the purge request is received from a content provider such as an origin server that provides content to be served/distributed by a content distribution network (e.g., CDN). For example, the purge request is received from client 102 at content distribution manager 106 of FIG. 1. In some embodiments, the purge request is received from a user that accesses a receiver of the purge request via an interface provided by the receiver. For example, content distribution manager 106 of FIG. 1 provides a web interface to allow an authorized user to provide the purge request. In some embodiments, the purge request has been provided using an API of the receiver of the purge request. The purge request may identify the content (e.g., content location address) to be purged. For example, the purge request identifies one or more uniform resource identifiers (URIs) and/or uniform resource locators (URLs) of the content to be purged. The purge request may be encrypted.

In some embodiments, the received purge request is verified. For example, verification is performed to determine whether a requestor of the purge request is authorized to provide a request to purge an identified content of the purge request. If the purge request is determined as unauthorized, the process may end and an error message may be sent to the requestor.

At 204, one or more purge instructions based on the request are queued for each node to be purged. In some embodiments, the nodes to be purged include all member content distribution nodes (e.g., edge nodes) of a content distribution network. In some embodiments, the nodes to be purged may be identified in a listing stored by a content distribution manager such as manager 106 of FIG. 1. The list of nodes to be purged (e.g., list of content distribution nodes of a content distribution network) may be dynamically generated and/or statically configured. The list may also be updated (e.g., automatically updated, dynamically determined, and/or manually configured) as nodes of a content distribution network are removed and/or added. In some embodiments, a content distribution manager may manage a plurality of content distribution networks, the content distribution network associated with the request is determined, and the nodes of the determined distribution network are selected as the nodes to be purged.

In some embodiments, each node to be purged is associated with a separate queue that may include one or more queued purge instructions. The purge instruction based on the purge request instructs a node to purge (e.g., remove or update) a specified content of the purge request from a storage of the node. The queues of the nodes of a content distribution network are stored and/or managed by a content distribution manager (e.g., manager 106 of FIG. 1). In some embodiments, the queues are managed using Advanced Message Queuing Protocol (AMQP). For example, RabbitMQ software is utilized to implement and manage the queues. The queue of each node managed by the content distribution manager may be configured as a first-in-first-out (FIFO) queue. For example, the oldest purge instruction entry is removed for processing before newer entries. In some embodiments, when a purge instruction is placed in the queue, the purge instruction is associated with a time value (e.g., timestamp).

The nodes to be purged may be in different availability states. For example, a node that is functioning normally and available to serve/distribute content to users is in an available state (e.g., online status), a node that is not available to serve/distribute content to users is in an unavailable state (e.g., offline status), and a previously unavailable node that is in the process of becoming available is in a transition state (e.g., ready-to-be-online status). The availability state of each node of a content distribution network may be tracked by the content distribution manager. For example, the content distribution manager detects and updates a listing (e.g., stored in storage 108 of FIG. 1) of the availability state of each node.

When a node of a content distribution network is available (e.g., online), it actively processes purge instructions stored in its queue. For example, each online node periodically checks whether any purge instructions are stored in its queue and requests purge instructions from its queue (e.g., in FIFO order) one by one for processing. When a node is not available (e.g., offline), the queue of the node stores queued purge instructions to allow the node to process the queued purge instructions when the node becomes available to process the instructions. A purge instruction implementing the received purge request is placed in each queue of content distribution nodes of a content distribution network to be purged. In an alternative embodiment, if a node is available, the purge instruction may be directly issued to the node without storing the purge instruction in a queue.

At 206, it is verified that all available nodes have purged their storage with respect to the purge request. In some embodiments, when a node successfully processes a provided purge instruction (e.g., clear specified content from local storage/cache of the node), the node provides a confirmation that the purge instruction has been successfully processed by the node. This confirmation may be received by the content distribution manager and the manager tracks whether the purge instructions of a specific purge request have been successfully completed (e.g., tracked using storage 108 of FIG. 1). In some embodiments, it is verified that all available nodes purged their storage with respect to the purge request if all nodes of a content distribution network that are indicated to be available (e.g., online) have provided a confirmation that a provided purge instruction corresponding to the purge request has been successfully completed.

At 208, a confirmation is provided that the purge request has been successfully completed. For example, a provider of the purge request is provided an indication that the indicated content to be purged in the request will effectively no longer be provided by a content distribution network. This confirmation may allow the receiver of the confirmation to implement a change, a process, a service, an update, and/or an upgrade that relies on the indicated content of the request to be no longer provided by the content distribution network. In some embodiments, the confirmation may be provided even though unavailable nodes (e.g., offline nodes) have not purged their individual cache/storage by processing the purge instructions corresponding to the purge request because each unavailable node is configured to process the purge instruction in its queue before the unavailable node becomes available. In some embodiments, the confirmation is only provided if the verification of 206 is made and it is verified that a purge instruction corresponding to the purge request has been successfully added to each queue of any nodes that are unavailable. In some embodiments, the confirmation is only provided if the verification of 206 is made, it is verified that all transitional nodes purged their storage with respect to the purge request (e.g., successfully completed the purge instruction corresponding to the purge request), and it is verified that a purge instruction corresponding to the purge request has been successfully added to each queue of any nodes that are unavailable.

Figure 3:
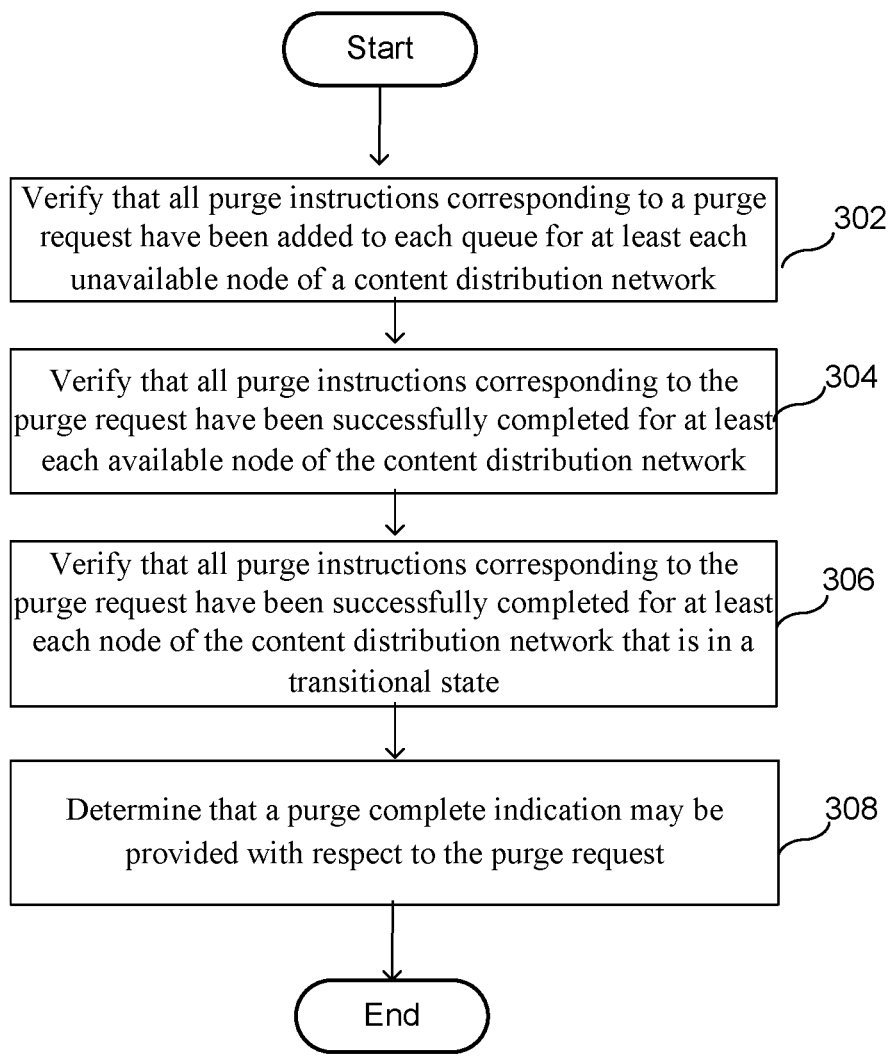
FIG. 3 is a flowchart illustrating an embodiment of a process for determining a status of a purge request.

FIG. 3 is a flowchart illustrating an embodiment of a process for determining a status of a purge request. The process of FIG. 3 may be at least in part implemented on content distribution manager 106 of FIG. 1. In some embodiments, at least a portion of the process of FIG. 3 is included in 206 and/or 208 of FIG. 2.

At 302, it is verified that all purge instructions corresponding to a purge request have been added to each queue for at least each unavailable node of a content distribution network. In some embodiments, the purge request is the purge request received in 202 of FIG. 2 and the queue is the queue utilized in 204 of FIG. 2. In some embodiments, a content distribution manager (e.g., manager 106 of FIG. 1) tracks an availability state (e.g., a node can be either in available, unavailable, or transitional state) of each content distribution node of the content distribution network. In some embodiments, for each tracked node that is known to be in an unavailable state (e.g., offline status and not available to serve content to requestors), it is verified that a purge instruction implementing the purge request has been added to the unavailable node's purge instruction queue. In some embodiments, for each purge request, statuses of the purge instructions corresponding to the purge request are tracked, and for each node that is identified to be in an unavailable state, the purge instruction status of the node identifies whether the purge instruction of the purge request has been added to the node's queue. When the purge instruction is added to a queue of a node, the purge instruction status of each node is updated to identify that the instruction has been added, and the verification of 302 may be performed by checking this purge instruction status of nodes that are indicated to be in an unavailable state. In some embodiments, the verification of 302 may be made as a confirmation that unavailable nodes have completed the purge instruction even though unavailable nodes have not purged their storage by processing the purge instructions in their queues because each node is configured to process required purge instructions before the unavailable node becomes available.

At 304, it is verified that all purge instructions corresponding to the purge request have been successfully completed for at least each available node of the content distribution network. In some embodiments, for each node of the content distribution network that is known to be in an available state (e.g., online and ready to serve/distribute cached content), it is verified that the purge instruction has been successfully processed and completed (e.g., content indicated by the instruction has been purged by the node). If the purge instruction has not been completed for an available node, the process waits until the purge instruction has been completed by the node before providing the verification in 304. In some embodiments, for each purge request, statuses of the purge instructions corresponding to the purge request are tracked, and for each node that is identified to be in an available state, the purge instruction status of the node identifies whether a confirmation has been received that the purge instruction of the purge request has been successfully completed by the node. For example, when a node obtains a purge instruction from its queue and successfully processes the purge instruction, the node provides a notification that the purge instruction has been completed to a content distribution manager that tracks the completion of purge instructions. When the purge instruction has been successfully completed by a node, the purge instruction status of the node for the particular purge request is updated to identify that the instruction has been completed, and the verification of 304 may be performed by checking the purge instruction status of nodes that are indicated to be in an available state.

At 306, it is verified that all purge instructions corresponding to the purge request have been successfully completed for at least each node of the content distribution network that is in a transitional state. In some embodiments, for each node of the content distribution network that is known to be in the transitional state (e.g., node is not currently serving/distributing stored content as an available node, but the node is preparing (e.g., processing purge instructions in its queue) to become an available node), it is verified that the purge instruction has been successfully completed. If the purge instruction has not been completed by a transitional node, the process waits until the purge instruction has been completed before providing the verification in 306. In some embodiments, for each purge request, statuses of the purge instructions corresponding to the purge request are tracked, and for each node that is identified to be in a transitional state, the purge instruction status of the node identifies whether a confirmation has been received that the purge instruction of the purge request has been successfully completed by the node. For example, when a node obtains a purge instruction from its queue and successfully processes the purge instruction, the node provides a notification that the purge instruction has been completed to a content distribution manager that tracks the completion of purge instructions. When the purge instruction has been successfully completed by a node, the purge instruction status of the node for the particular purge request is updated to identify that the instruction has been completed, and the verification of 306 may be performed by checking the purge instruction status of nodes that are indicated to be in a transitional state. In an alternative embodiment, step 306 is optional.

At 308 it is determined that a purge complete indication may be provided with respect to the purge request. In some embodiments, the determination of 308 is only made if the verifications have been successfully completed for steps 302, 304, and 306. In some embodiments, the determination of 308 is only made if the verifications have been successfully completed for at least steps 302 and 304. The determination in 308 may allow the confirmation to be provided in 208 of FIG. 2.

Figure 4:
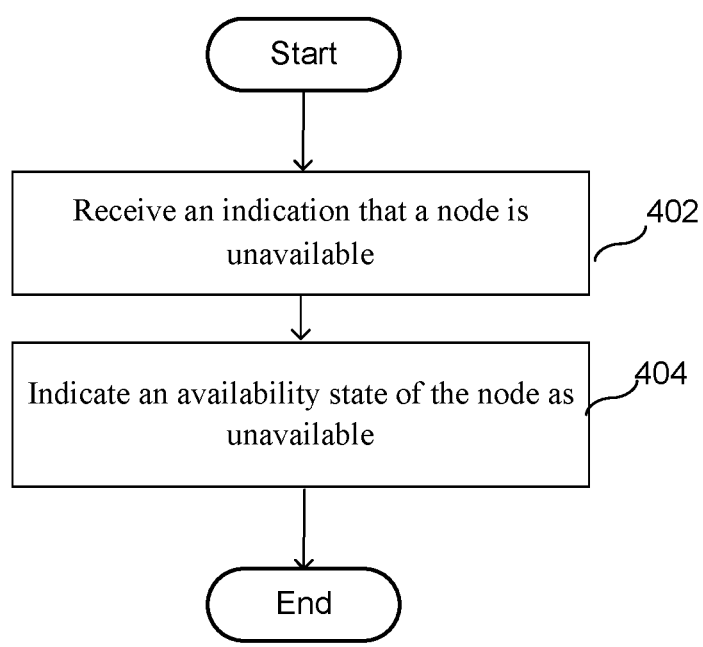
FIG. 4 is a flowchart illustrating an embodiment of a process for updating a status of a node as unavailable.

FIG. 4 is a flowchart illustrating an embodiment of a process for updating a status of a node as unavailable. The process of FIG. 4 may be at least in part implemented on content distribution manager 106 of FIG. 1.

At 402, an indication is received that a node is unavailable. The node may be unavailable because the node has encountered an error, is being upgraded, is being updated, is being maintained, etc. In some embodiments, the node is a content distribution node (e.g., edge node) of a content distribution network. An unavailable node may be not available to serve/distribute content. The indication may be received by a content distribution manager that tracks an availability state of the node. In some embodiments, the indication is received from the node. For example, the node provides a message that the node has encountered an error and/or will become unavailable (e.g., due to upgrade, update, etc.). In some embodiments, the indication is received if the node does not provide a message. For example, the node provides a heartbeat message periodically and the indication is received if the heartbeat message has not been received within a period amount of time. In another example, the content distribution manager periodically sends a status inquiry message to the node and the indication is received if the node does not respond to the status inquiry message.

At 404, an availability state of the node is indicated as unavailable. For example, a stored status indicator of the node is updated as "offline." In some embodiments, indicating the state includes modifying a data structure of a content distribution manager that tracks the availability state of nodes of a content distribution network. For example, a list entry corresponding to the node is updated to indicate that the node is unavailable. The state indicated in 404 may be used in 302 of FIG. 3 to at least in part determine whether the node is unavailable.

Figure 5:
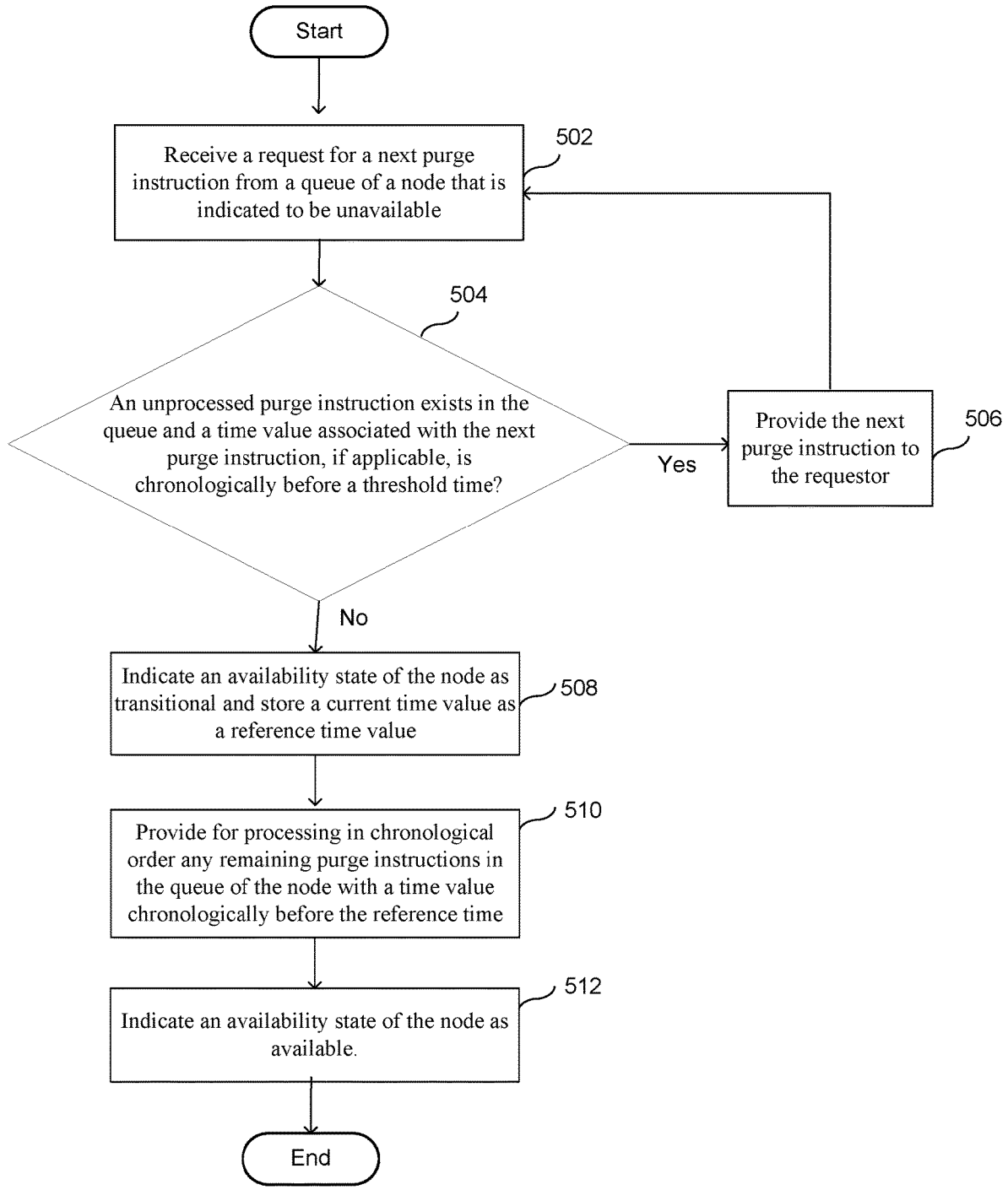
FIG. 5 is a flowchart illustrating an embodiment of a process for updating a status of a node as available.

FIG. 5 is a flowchart illustrating an embodiment of a process for updating a status of a node as available. The process of FIG. 5 may be at least in part implemented on content distribution manager 106 of FIG. 1.

At 502, a request for a next purge instruction from a queue of a node that is indicated to be unavailable is received. In some embodiments, the next purge instruction from the queue is the purge instruction added to the queue in 204 of FIG. 2. In some embodiments, the request is received from the node that is indicated to be in an unavailable state. For example, the node was previously indicated to be unavailable in 404 of FIG. 4, and the node has provided the request for the next purge instruction in order to process a backlog of one or more purge instructions in its queue in preparation to become available again to serve/distribute content as a part of a content distribution network.

At 504 it is determined whether an unprocessed purge instruction exists in the queue and whether a time value associated with the next purge instruction, if applicable, is chronologically before a threshold time. For example, it is determined whether any purge instruction is left in the queue of the node and if there exists an instruction in the queue, a purge instruction with the oldest timestamp (e.g., purge instruction in the queue is provided in FIFO order) is selected as the next purge instruction to be provided.

In some embodiments, determining whether the time value associated with the next purge instruction is chronologically before the threshold time includes determining whether a timestamp of the next purge instruction (e.g., timestamp indicates when the next purge instruction was added to the queue) is chronologically before the threshold time. In some embodiments, the threshold time is associated with a current time when the determination is made. For example, the threshold time is a dynamic value determined by subtracting a predetermined amount of a time period (e.g., five minutes) from a current time. This may allow verification of whether FIFO processing of queued purge instructions has reached a state of the queue where any purge instruction potentially still waiting in the queue to be processed has been added to the queue within the last predetermined amount of time (e.g., narrowing the amount of purge instructions that can remain queued in the queue before the node transitions to a transitional state). In some embodiments, the threshold time is associated with a time when the node began processing queued purge instructions in its queue after becoming unavailable. For example, the threshold time is set as the time when the first purge instruction was requested from the queue of the node after the node become unavailable.

If at 504 it is determined that the next purge instruction exists in the queue and the time value associated with the next purge instruction is chronologically before the threshold time, at 506, the next purge instruction is provided to the requestor. For example, the next purge instruction is removed from the queue and provided to the node for processing and completion. Once a notification is provided that a purge instruction has been successfully completed by the node, the process returns to 502.

If at 504 it is determined that the next purge instruction does not exist in the queue or the time value associated with the next purge instruction is chronologically not before the threshold time, at 508, an availability state of the node is indicated as transitional and a current time value is stored as a reference time value. For example, a stored availability status indicator of the node is updated as "ready-to-become online." In some embodiments, indicating the status includes modifying a data structure of a content distribution manager that tracks availability state of content distribution nodes of a content distribution network. For example, a data structure entry corresponding to the availability state of the node is updated to indicate that the node is in the transitional state. When a node is in the transitional state, the node may be unavailable to serve/distribute requested content as a part of a content distribution network, but unlike the unavailable state, adding a purge instruction of a purge request in its queue without having the transitional state node process and complete the purge instruction does not allow a confirmation to be provided that the purge request has been processed (e.g., as compared to an unavailable state node where adding the purge instruction to its queue would be sufficient). The state entry indicated in 508 may be used in 306 of FIG. 3 to at least in part determine whether the node is in a transitional state. Determining the reference time may include determining a current time when the node is placed in the transitional state and recording the current time as the reference time.

At 510, any remaining purge instructions in the queue of the node with a time value chronologically before the reference time are provided for processing in chronological order. For example, the node requests a next purge instruction from its queue and the next purge instruction is provided (e.g., in FIFO order of the queue) for processing by the node. The node indicates when it has successfully processed the purge instruction. The applicable purge instructions are provided in order until there does not exist any remaining purge instruction in the queue that has a time value (e.g., timestamp of when the instruction was added to the queue) before the reference time. Thus the transitional state may allow a node to process queued purge instructions while not requiring additional purge instructions added to its queue while the node is in the transitional state to be completed before the node switches its availability state to become available.

At 512, an availability state of the node is indicated as available. For example, a stored status indicator of the node is updated as "online." In some embodiments, indicating the state includes modifying a data structure of a content distribution manager that tracks availability states of nodes of a content distribution network. For example, a data structure entry corresponding to the node is updated to indicate that the node is available. The state entry indicated in 512 may be used in 304 of FIG. 3 to at least in part determine whether the node is available.

Figure 6:
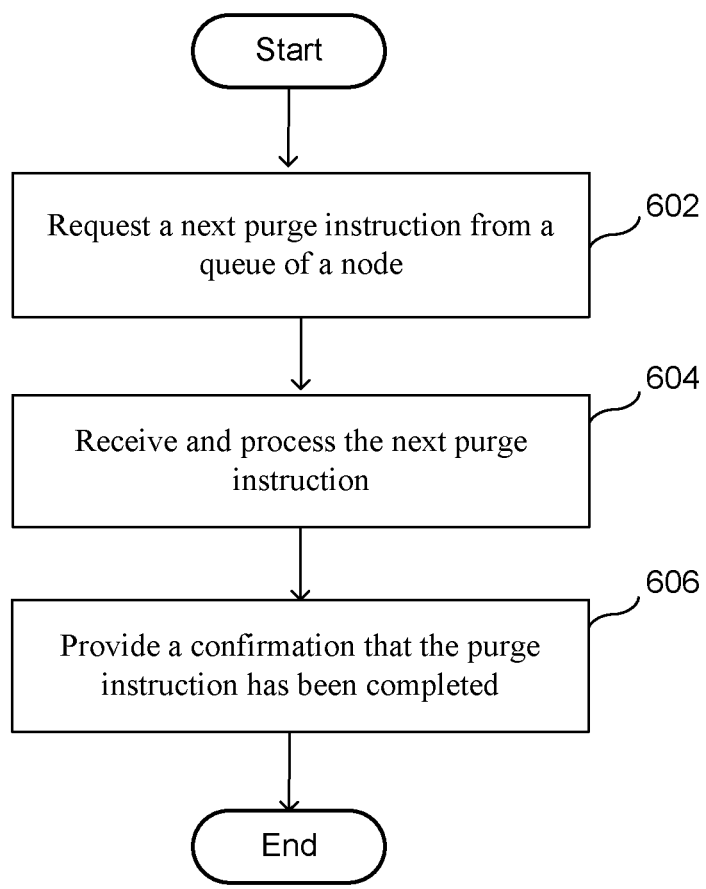
FIG. 6 is a flowchart illustrating an embodiment of a process for processing a purge instruction.

FIG. 6 is a flowchart illustrating an embodiment of a process for processing a purge instruction. The process of FIG. 6 may be at least in part implemented on one or more of nodes 112, 114, and 116 of FIG. 1. In some embodiments, the process of FIG. 6 may be performed continually while a node is not unavailable.

At 602, a next purge instruction is requested from a queue of a node. In some embodiments, the next purge instruction from the queue is the purge instruction added to the queue in 204 of FIG. 2. In some embodiments, the request of 602 is received in 502 or 510 of FIG. 5. In the event the next purge instruction does not exist (e.g., queue is empty), the process may end and the process may be repeated (e.g., periodically).

At 604, the next purge instruction is received and processed. In some embodiments, processing the purge instruction includes clearing an indicated content of the purge instruction from a storage/cache of the node. For example, a cache of the node is cleared of a content referenced by a location address specified in the purge instruction. In some embodiments, processing the purge instruction includes replacing/refreshing an indicated content of the purge instruction in a storage of the node. For example, a cache of the node is of an indicated content and/or reloaded with a content referenced by a location address specified in the purge instruction.

At 606, a confirmation is provided that the purge instruction has been completed. For example, the confirmation is provided to a content distribution manager (e.g., manager 106 of FIG. 1) to allow the content distribution manager to track completion of the purge instruction, an availability status of the node, and/or when a next purge instruction should be provided.

Figure 7:
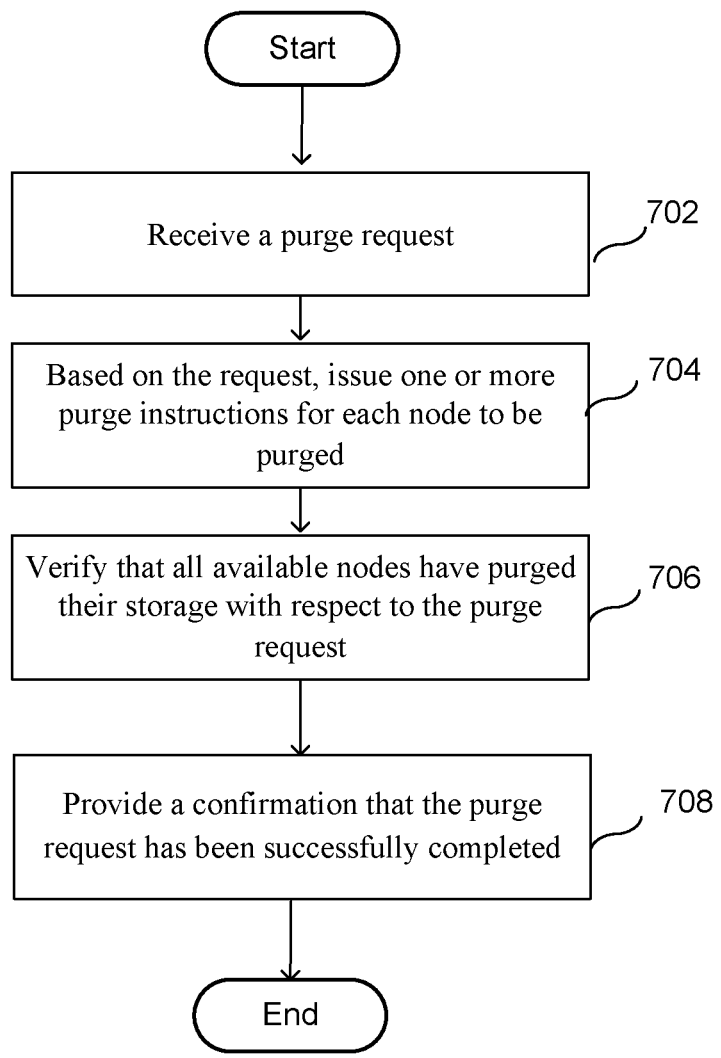
FIG. 7 is a flowchart illustrating an embodiment of a process for processing a purge request.

FIG. 7 is a flowchart illustrating an embodiment of a process for processing a purge request. The process of FIG. 7 may be at least in part implemented on content distribution manager 106 of FIG. 1.

At 702, a purge request is received. The purge request may specify that content is to be removed and/or updated from caches/storages of content distribution nodes of a content distribution network. The content distribution network may include one or more nodes that proxy content and provide content to various users that may be able to obtain content faster from one content distribution node over another node. In some embodiments, the purge request is received from a content provider such as an origin server that provides content to be served/distributed by a content distribution network (e.g., CDN). For example, the purge request is received from client 102 at content distribution manager 106 of FIG. 1. In some embodiments, the purge request is received from a user that accesses a receiver of the purge request via an interface provided by the receiver. For example, content distribution manager 106 of FIG. 1 provides a web interface to allow an authorized user to provide the purge request. In some embodiments, the purge request has been provided using an API of the receiver of the purge request. The purge request may identify the content (e.g., content location address) to be purged. For example, the purge request identifies one or more uniform resource identifiers (URIs) and/or uniform resource locators (URLs) of the content to be purged. The purge request may be encrypted.

In some embodiments, the received purge request is verified. For example, verification is performed to determine whether a requestor of the purge request is authorized to provide a request to purge an identified content of the purge request. If the purge request is determined as unauthorized, the process may end and an error message may be sent to the requestor.

At 704, one or more purge instructions, based on the request, are issued for each node to be purged. In some embodiments, the nodes to be purged include all member content distribution nodes (e.g., edge nodes) of a content distribution network. In some embodiments, the nodes to be purged may be identified in a listing stored by a content distribution manager such as manager 106 of FIG. 1. The list of nodes to be purged (e.g., list of content distribution nodes of a content distribution network) may be dynamically generated and/or statically configured. The list may also be updated (e.g., automatically updated, dynamically determined, and/or manually configured) as nodes of a content distribution network are removed and/or added. In some embodiments, a content distribution manager may manage a plurality of content distribution networks, the content distribution network associated with the request is determined, and the nodes of the determined distribution network are selected as the nodes to be purged.

The nodes to be purged may be in different availability states. For example, a node that is functioning normally and available to serve/distribute content to users is in an available state (e.g., online status), a node that is not available to serve/distribute content to users is in an unavailable state (e.g., offline status), and/or a previously unavailable node that is in the process of becoming available is in a transition state (e.g., ready-to-be-online status). The availability state of each node of a content distribution network may be tracked by the content distribution manager. For example, the content distribution manager detects and updates a listing (e.g., stored in storage 108 of FIG. 1) of the availability state of each node.

In some embodiments, the nodes to be purged include all available state nodes of a content distribution network. When a node of a content distribution network is available (e.g., online), it actively processes the issued purge instruction. For example, the issued purge instruction is received by an available node and the node processes the issued purge instruction. When a node is known to be not available (e.g., offline), the purge instruction may not be issued to the unavailable node.

At 706, it is verified that all available nodes have purged their cache storage with respect to the purge request. In some embodiments, when a node successfully processes a provided purge instruction (e.g., clear/mark specified content from local storage/cache of the node), the node provides a confirmation that the purge instruction has been successfully processed by the node. This confirmation may be received by the content distribution manager and the manager tracks whether the purge instructions of a specific purge request have been successfully completed (e.g., tracked using storage 108 of FIG. 1). In some embodiments, it is verified that all available state nodes purged their storage with respect to the purge request if all nodes of a content distribution network that are indicated to be available (e.g., online) have provided a confirmation that a provided purge instruction corresponding to the purge request has been successfully completed. In some embodiments, a node that was available is identified as unavailable if the issued purge request cannot be processed by the node. For example, when a communication cannot be established with a node to provide the purge instruction and/or the node does not provide a confirmation that the purge instruction has been completed, the purge instruction may be retried until a limit is reached (e.g., time limit, number of retries limit, etc.). If the limit has been reached for a node, the node may be marked as unavailable and a verification the node has purged its cache storage with respect to the purge request is not required in 706.

At 708, a confirmation is provided that the purge request has been successfully completed. For example, a provider of the purge request is provided an indication that the indicated content to be purged in the request will effectively no longer be provided by a content distribution network. This confirmation may allow the receiver of the confirmation to implement a change, a process, a service, an update, and/or an upgrade that relies on the indicated content of the request to be no longer provided by the content distribution network. In some embodiments, the confirmation may be provided even though unavailable nodes (e.g., offline nodes) have not purged their individual cache/storage by processing the purge instructions corresponding to the purge request because each unavailable node is configured to clear and/or verify entries in its cache storage before becoming available again.

Figure 8:
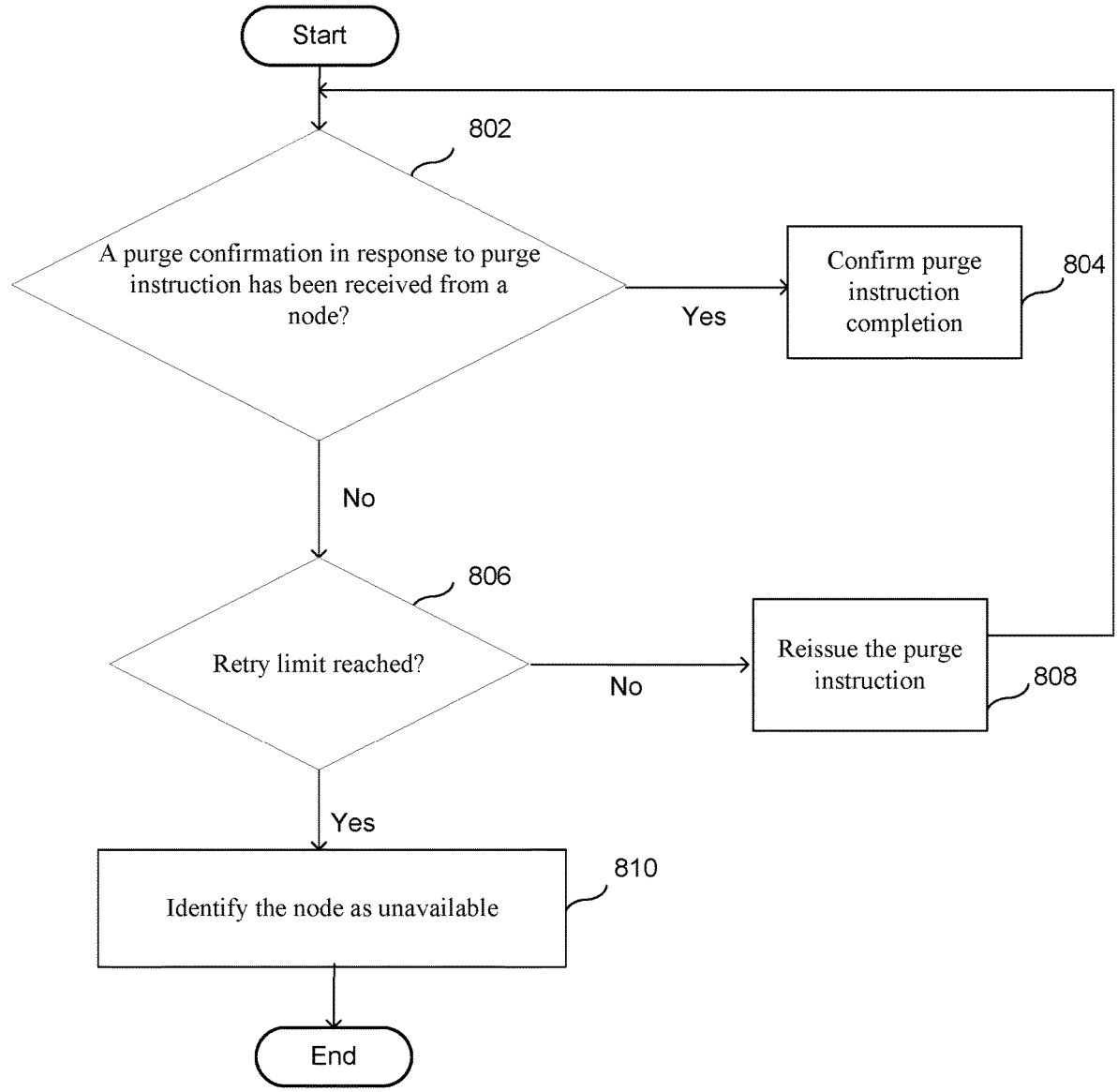
FIG. 8 is a flowchart illustrating an embodiment of a process for processing a purge request.

FIG. 8 is a flowchart illustrating an embodiment of a process for processing a purge request. The process of FIG. 8 may be at least in part implemented on content distribution manager 106 of FIG. 1. In some embodiments, the process of FIG. 8 is included in 706 of FIG. 7. In some embodiments, the process of FIG. 8 is repeated for each node to be purged in response to a purge request. For example, the process of FIG. 8 is repeated for each node that was issued a purge instruction in 704 of FIG. 7.

At 802, it is determined whether a purge confirmation in response to a purge instruction has been received from a node. In some embodiments, the purge confirmation is in response to the purge instruction issued in 704 of FIG. 7. The purge confirmation may confirm that the purge instruction has been processed and cache of the node has been purged of a cache entry specified by the purge instruction. In some embodiments, if the purge confirmation has not been received after a predetermined amount of time after the purge instruction has been issued to the node, it is determined at 802 that the purge confirmation has not been received.

If at 802 it is determined that the purge confirmation has been received, at 804 purge instruction completion is confirmed for the node and the process ends. For example, after 804, the process of FIG. 8 may be repeated for a next available status node of a content distribution network.

If at 802 it is determined that the purge confirmation has not been received, at 806 it is determined whether a retry limit has been reached. The retry limit may be associated with a threshold amount of time since a first attempt of the purge instruction of a purge request (e.g., received in 702 of FIG. 7) has been issued to the node and/or a number of times the purge instruction of the same purge request has been issued to the node. For example, the retry limit is reached after a predetermined amount of time after the purge request has been received and/or after a predetermined number of times a purge instruction has been issued for the same purge request to the node.

If at 806 it is determined that the retry limit has not been reached, at 808 the purge instruction is reissued to the node and the process returns to 802. For example, the purge instruction issued in 704 of FIG. 7 is reissued to the node.

If at 806 it is determined the retry limit has been reached, at 810 the node is identified as unavailable and the process ends. For example, because the node is unavailable, a verification the node has purged its cache storage with respect to the purge request is not required in 706 of FIG. 7. In some embodiments, a node that is identified as unavailable is not issued a purge instruction in 704 of FIG. 7. In some embodiments, after 810, the process of FIG. 8 may be repeated for a next available statue node in a content distribution network.

Figure 9:
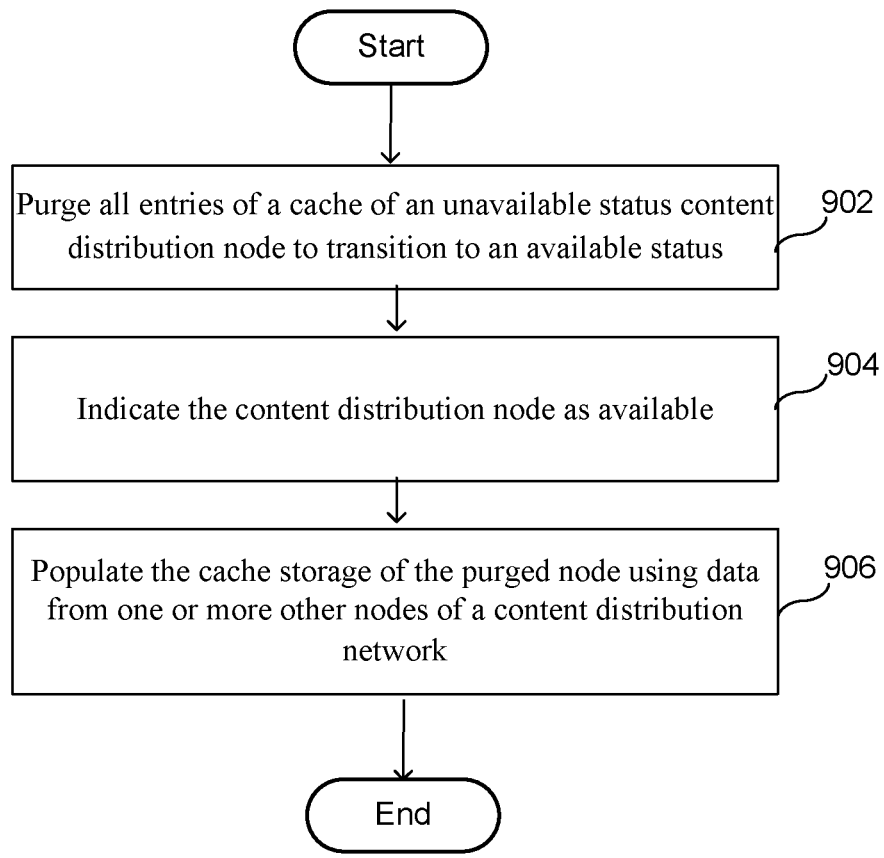
FIG. 9 is a flowchart illustrating an embodiment of a process for purging a cache of a content distribution node.

FIG. 9 is a flowchart illustrating an embodiment of a process for purging a cache of a content distribution node. The process of FIG. 9 may be at least in part implemented on content distribution node 112, 114 and/or 116 of FIG. 1. In some embodiments, the process of FIG. 9 is performed before an unavailable status content distribution node is switched to an available state.

At 902, all entries of a cache of an unavailable status content distribution node to transition to an available status are purged. For example, a node that has become unavailable (e.g., identified as unavailable in 404 of FIG. 4 and/or 810 of FIG. 8) is initialized to become available again and all entries of the cache storage of the node are purged. The entire cache contents may be purged to ensure that cached content that might have been modified while the node was unavailable is not served by the node.

At 904, the content distribution node is indicated as available. For example, the availability status of the content distribution node is indicated as available after the purge and the node is able to serve requested content from a client.

At 906, the cache storage of the purged node is populated using data from one or more other nodes of a content distribution network. In some embodiments, once the cache storage is purged in 902, the purged cache storage is populated using cached data from one or more other available peer nodes of a content distribution network of the purged node. For example, nearby nodes (e.g., close in physical distance and/or network topology, etc.) and/or optimal nodes (e.g., nodes with highest available bandwidth, nodes with highest available processing resources, etc.) provide at least a portion of their cached data to populate the cache storage.

Figure 10:
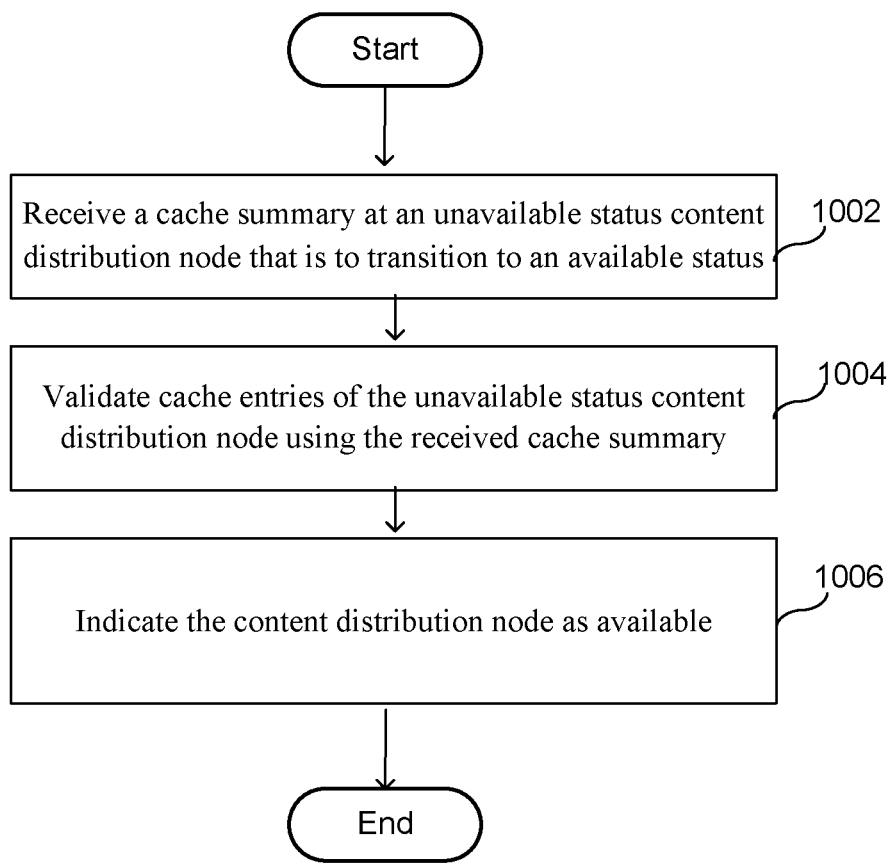
FIG. 10 is a flowchart illustrating an embodiment of a process for validating a cache of a content distribution node.

FIG. 10 is a flowchart illustrating an embodiment of a process for validating a cache of a content distribution node. The process of FIG. 10 may be at least in part implemented on content distribution node 112, 114 and/or 116 of FIG. 1. In some embodiments, the process of FIG. 10 is performed before an unavailable status content distribution node is switched to an available state.

At 1002, a cache summary is received at an unavailable status content distribution node that is to transition to an available status. In some embodiments, the cache summary is received from one or more other available status peer nodes of a content distribution network. For example, the cache summary indicates status/metadata (e.g., data identifier, version identifier, last updated time, URI, header data, etc.) about cache entries stored in a cache of the peer node. One or more nearby nodes (e.g., close in physical distance and/or network topology, etc.) and/or optimal nodes (e.g., nodes with highest available bandwidth, nodes with highest available processing resources, etc.) may provide at least a portion of the cache summary.

At 1004, cache entries of the unavailable status content distribution node are validated using the received cache summary. For example, for each cache entry in a cache storage of the node, the cached entry is validated to ensure that the cache entry contains the latest valid version of the cached data. If a corresponding cache summary entry of the cache entry indicates the cache entry is not the latest version or the cache entry cannot be verified (e.g., no corresponding cache summary entry exists), the cache entry may be purged and/or updated (e.g., updated using data from one or more peer nodes of the content distribution network).

At 1006, the content distribution node is indicated as available. For example, the availability status of the content distribution node is indicated as available and the node is able to serve requested content from a client.

Figure 11:
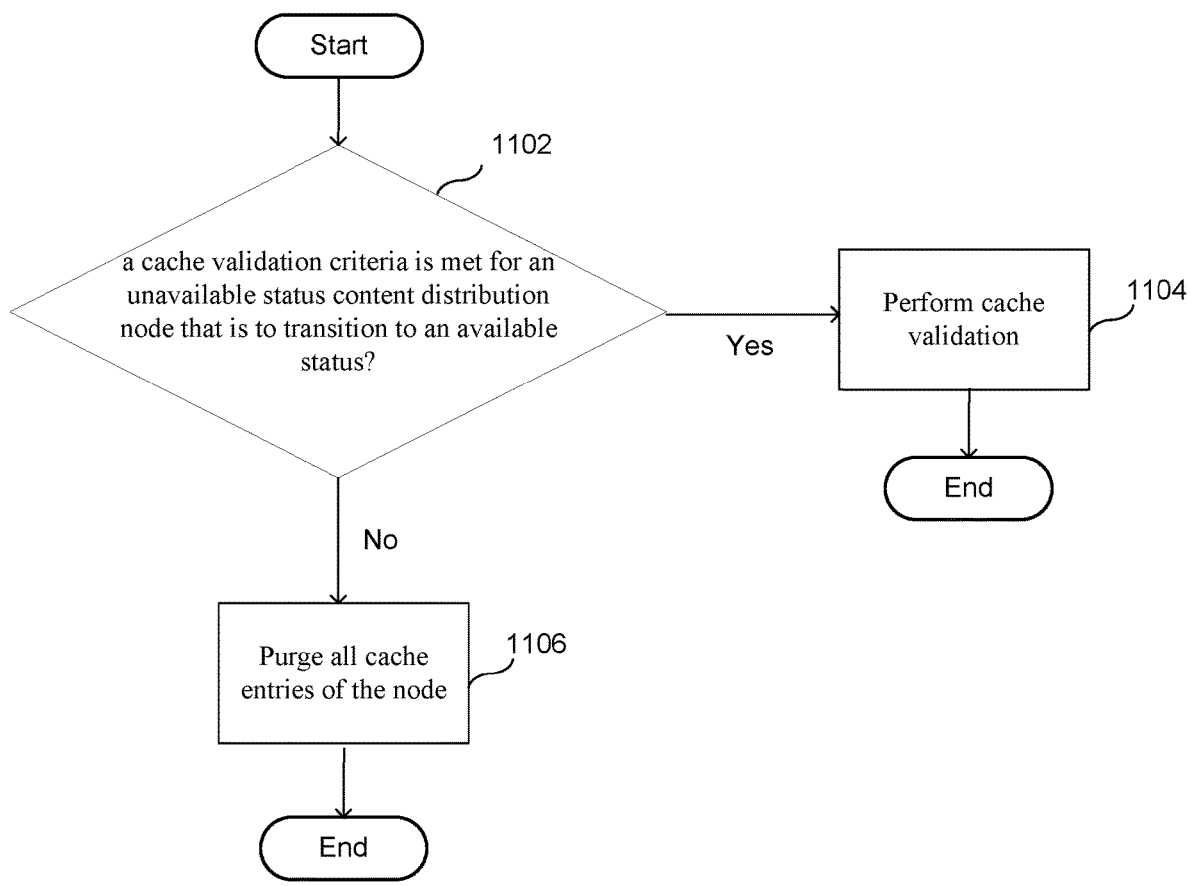
FIG. 11 is a flowchart illustrating an embodiment of a process for validating a cache of a content distribution node.

FIG. 11 is a flowchart illustrating an embodiment of a process for validating a cache of a content distribution node. The process of FIG. 11 may be at least in part implemented on content distribution node 112, 114 and/or 116 of FIG. 1. In some embodiments, the process of FIG. 11 is performed before an unavailable status content distribution node is switched to an available state.

At 1102, it is determined whether a cache validation criteria is met for an unavailable status content distribution node that is to transition to an available status. For example, it is determined whether it is worth spending resources to validate each cache entry of the node before the node becomes available or it would be more optimal to purge all cache entries of the node. In some embodiments, if the node has been unavailable for less than a threshold amount of time, it is determined that the cache validation criteria is met and if the node has been unavailable for greater than or equal to the threshold amount of time, it is determined that the cache validation criteria is not met. The validation criteria may be associated with one or more of the following: a length of time the node has been unavailable, amount of data stored in a cache storage of the node, an availability of one or more other peer nodes, an available bandwidth, available processing resources, and an indication of when the node is to become available.

If at 1102 it is determined that a cache validation criteria is met, at 1104 cache validation is performed. In some embodiments, performing cache validation includes performing at least a portion of the process of FIG. 10.

If at 1102 it is determined that a cache validation criteria is not met, at 1106 all cache entries of the node are purged. In some embodiments, performing cache purge includes performing at least a portion of the process of FIG. 9.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a purge request, comprising:
   receiving the purge request from a node, wherein the purge request is for a next purge instruction and the node has an associated queue of one or more purge instructions with associated timestamps;
   in response to receiving the purge request, providing an unprocessed purge instruction having a timestamp before a threshold time; and
   after processing the purge instruction having a timestamp before the threshold time, processing remaining purge instructions as follows:
      indicating an availability state of the node as transitional;
      storing a current time value as a reference time value;
      processing, in chronological order, those remaining purge instructions in the queue with a time value chronologically before the reference time value; and
      indicating an availability state of the node as available.

2. The method of claim 1, wherein the next purge instruction is provided by a queue of a node unavailable to serve/distribute content to users.

3. The method of claim 2, wherein the unavailable node is a node with a status of being offline.

4. The method of claim 2, wherein an availability status of the unavailable node is tracked by a content distribution manager.

5. The method of claim 2, wherein the unavailable node sends the purge request to begin processing a backlog of one or more purge instructions.

6. The method of claim 1, wherein the providing the unprocessed purge instruction having a timestamp before the threshold time includes determining that a time value associated with the next purge instruction is chronologically before a threshold time.

7. The method of claim 1, wherein the node is included in a content distribution network having a plurality of nodes, and each node in the content distribution network has a respective associated queue of one or more purge instructions.

8. The method of claim 1, further comprising determining that there is at least one unprocessed purge instruction having a timestamp before a threshold time, and wherein the threshold time is a time when the determination is made.

9. The method of claim 1, wherein the threshold time is a dynamic value determined by subtracting a predetermined amount of a time period from a current time.

10. The method of claim 1, wherein the threshold time is selected based at least in part on an estimated time for verifying that first-in-first-out processing of queued purge instructions has reached a state of the queue where any purge instruction still waiting in the queue to be processed has been added to the queue.

11. The method of claim 1, wherein the threshold time is selected based at least in part on a time allotted for purge instructions to remain queued in the queue before the node transitions to a transitional state.

12. The method of claim 1, wherein the threshold time is the time when a first purge instruction was requested from the queue of the node after the node became unavailable.

13. The method of claim 1, wherein in a transitional state, the node is not currently serving/distributing requested content as part of a content distribution network.

14. The method of claim 1, wherein in the transitional state, the node does not provide a process completion confirmation to a purge request.

15. The method of claim 1, wherein the reference time value is a time when the node enters a transitional state.

16. A system for processing a purge request, comprising:
   a communication interface configured to receive the purge request from a node, wherein the purge request is for a next purge instruction and the node has an associated queue of one or more purge instructions with associated timestamps
   a processor configured to:
      in response to receiving the purge request, providing an unprocessed purge instruction having a timestamp before a threshold time; and
      after processing the purge instruction having a timestamp before the threshold time, processing remaining purge instructions as follows:
         indicating an availability state of the node as transitional;
         storing a current time value as a reference time value;
         processing, in chronological order, those remaining purge instructions in the queue with a time value chronologically before the reference time value; and
         indicating an availability state of the node as available.

17. A computer program product embodied in a non-transitory computer readable storage medium and comprising computer instructions for:
   receiving a purge request from a node, wherein the purge request is for a next purge instruction and the node has an associated queue of one or more purge instructions with associated timestamps;
   in response to receiving the purge request, providing an unprocessed purge instruction having a timestamp before a threshold time; and
   after processing the purge instruction having a timestamp before the threshold time, processing remaining purge instructions as follows:
      indicating an availability state of the node as transitional;
      storing a current time value as a reference time value;

processing, in chronological order, those remaining purge instructions in the queue with a time value chronologically before the reference time value; and indicating an availability state of the node as available.

* * * * *